(12) United States Patent
Hair, Jr.

(10) Patent No.: US 7,790,075 B2
(45) Date of Patent: Sep. 7, 2010

(54) MULTI HARMONIC TIRE UNIFORMITY CORRECTION

(75) Inventor: Clarence Vernon Hair, Jr., Greenville, SC (US)

(73) Assignee: Michelin Recherche et Technique, Granges-Paccot (CH)

( * ) Notice: Subject to any disclaimer, the term of this patent is extended or adjusted under 35 U.S.C. 154(b) by 394 days.

(21) Appl. No.: 11/318,647

(22) Filed: Dec. 27, 2005

(65) Prior Publication Data

US 2007/0145623 A1    Jun. 28, 2007

(51) Int. Cl.
*B29D 30/00* (2006.01)

(52) U.S. Cl. .................. 264/40.1; 73/146; 264/320

(58) Field of Classification Search ............... 264/40.1, 264/501, 326, 320, 322, 340; 425/58.1, 385, 425/445, 446; 73/146
See application file for complete search history.

(56) References Cited

U.S. PATENT DOCUMENTS

| | | |
|---|---|---|
| 3,389,193 A | 6/1968 | Hughes |
| 3,464,264 A | 9/1969 | French |
| 3,529,048 A | 9/1970 | Kovac et al. |
| 3,632,701 A | 1/1972 | Devitt et al. |
| 3,838,142 A | 9/1974 | Hochstein |
| 3,872,208 A | 3/1975 | Brown et al. |
| 3,880,556 A | 4/1975 | Brown et al. |
| 3,926,704 A | 12/1975 | Sharp, Jr. |
| 3,945,277 A | 3/1976 | McGehee et al. |
| 4,173,850 A | 11/1979 | Gormish et al. |
| 4,458,451 A | 7/1984 | Rogers |
| 4,669,228 A | 6/1987 | Rogers |
| 4,837,980 A | 6/1989 | Rogers |
| 4,936,054 A | 6/1990 | Rogers et al. |
| 4,984,393 A | 1/1991 | Rogers |
| 5,022,186 A | 6/1991 | Rogers |
| 5,060,510 A | 10/1991 | Rousseau |
| 5,099,613 A | 3/1992 | Rogers |
| 5,365,781 A | 11/1994 | Rhyne |
| 5,458,176 A | 10/1995 | Rhyne |
| 5,616,859 A | 4/1997 | Rhyne |
| 2002/0014301 A1 | 2/2002 | Ogawa |

FOREIGN PATENT DOCUMENTS

| | | |
|---|---|---|
| GB | 1212701 | 11/1970 |
| KR | 10-160789 | 1/1999 |
| PL | 78542 | 9/1972 |
| WO | WO 93/19929 | 10/1993 |

OTHER PUBLICATIONS

Foundations of Modern Technology of Automobile Tires, Moscow, "Chemistry," Saltykov, A.V., Publishing House, 1974, pp. 402-405. (See Russian version of Article and an English translation of office action in which it was cited).

*Primary Examiner*—Mathieu D. Vargot
(74) *Attorney, Agent, or Firm*—Dority & Manning, P.A.

(57) ABSTRACT

An apparatus and method for reducing the magnitude of multiple harmonics of uniformity characteristics in a cured tire is claimed. A signal is generated which indicates the magnitude of the uniformity characteristic. A ring containing multiple plates is utilized to permanently deform portions of the carcass reinforcing member of the tire at locations indicated by the signal. The configuration of the plates is automatically determined based on the tire radial force variation waveform and the number of plates used.

13 Claims, 9 Drawing Sheets

MULTI HARMONIC TIRE UNIFORMITY CORRECTION

SUMMARY OF THE INVENTION

It is an object of the invention to provide a method for reducing the magnitude of a uniformity characteristic in a cured tire, said method comprising the steps of generating a signal indicative of a magnitude of the uniformity characteristic and an angular location on the tire to be corrected; decomposing the signal into two or more harmonics using a Fourier analysis; and permanently deforming a portion of at least three carcass reinforcing members of the tire at the locations indicated by the signal, wherein at least two harmonics of radial force variation are reduced simultaneously.

It is further an object of the invention to provide a method for reducing the magnitude of a uniformity characteristic in a cured tire, said method comprising the steps of generating a signal indicative of a magnitude of the uniformity characteristic and an angular location on the tire to be corrected; decomposing the signal into two or more harmonics using a Fourier analysis; permanently deforming, as a function of the magnitude of the uniformity characteristic, a portion of at least three carcass reinforcing members of the tire at the locations indicated by the signal, wherein at least two harmonics of radial force variation are reduced simultaneously; and restraining a portion of the sidewall of the tire to limit the permanent deformation to carcass reinforcing members in the restrained portion of the sidewall as a function of said location indication.

It is further an object of the invention to provide a method for reducing the magnitude of a uniformity characteristic in a cured tire, said method comprising the steps of generating a signal indicative of a magnitude of the uniformity characteristic and an angular location on the tire to be corrected; decomposing the signal into two or more harmonics using a Fourier analysis; permanently deforming, as a function of the magnitude of the uniformity characteristic, a portion of at least three carcass reinforcing members of the tire at the locations indicated by the signal, wherein at least two harmonics of radial force variation are reduced simultaneously; and restraining a portion of the sidewall of the tire to limit the permanent deformation to carcass reinforcing members in the restrained portion of the sidewall as a function of said location indication, wherein restraining comprises least two removable plates arranged circumferentially to form a ring and further includes the steps of contacting the sidewall of the tire with the ring prior to applying said inflation pressure; providing minimum restraint by minimizing plate height of the ring at a location corresponding to a soft spot on a tire; and providing maximum restraint by maximizing plate height of the ring at a location corresponding to a hard spot on a tire.

BRIEF DESCRIPTION OF THE DRAWINGS

Further features of the present invention will become apparent to those skilled in the art to which the present invention relates from reading the following specification with reference to the accompanying drawings, in which.

DESCRIPTION OF PREFERRED EMBODIMENTS OF THE INVENTION

Figure 1:
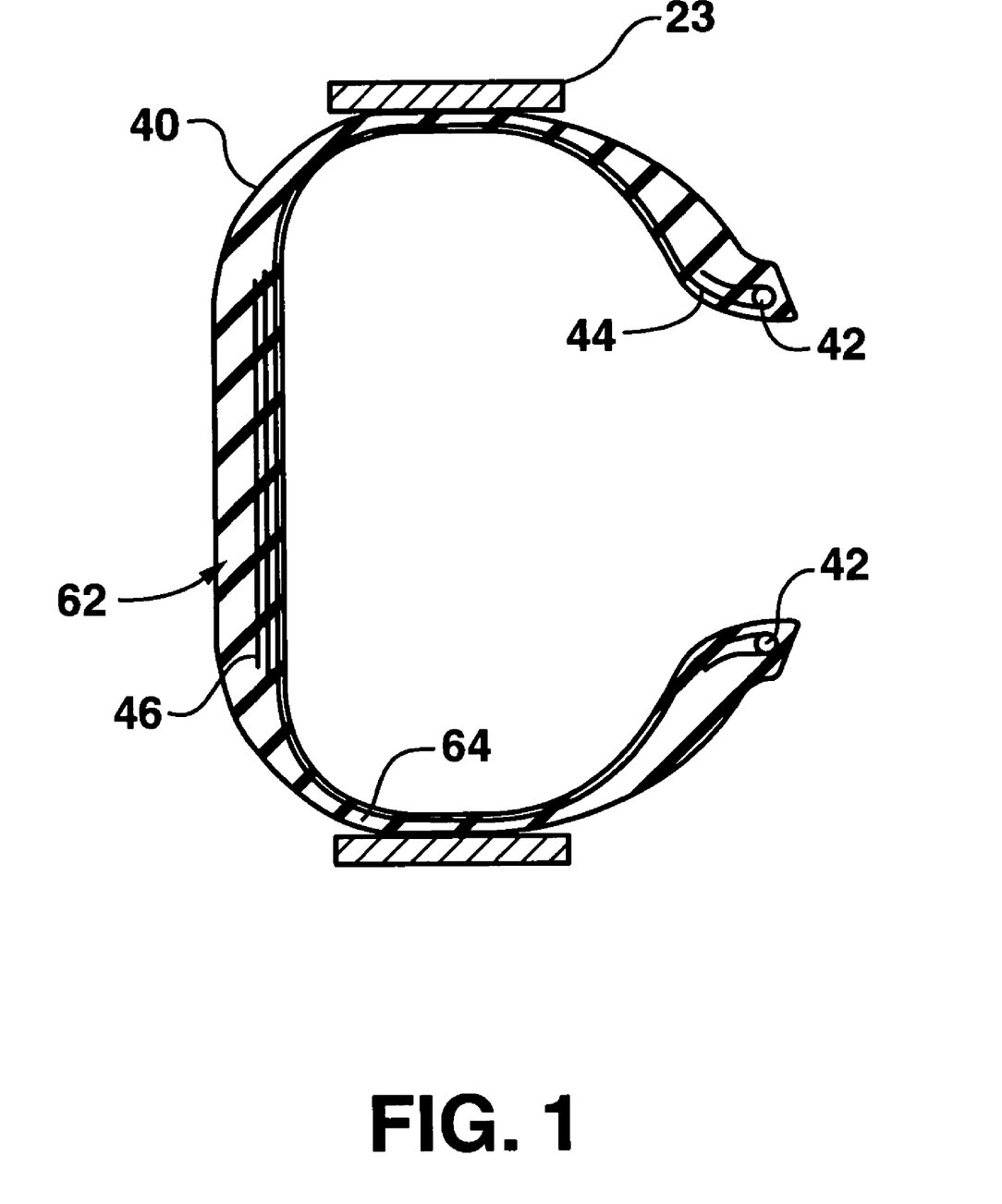
FIG. 1 is a cross-sectional view of a tire illustrating restraint of the sidewalls of the tire.

A radial pneumatic tire 40 for uniformity characteristic correction in accordance with the present invention is illustrated in FIG. 1 The tire 40 is rotatable about a longitudinal central axis of rotation. The tire 40 includes a pair of beads 42 which are substantially inextensible in a circumferential direction. The beads 42 are spaced apart in a direction parallel to the central axis. Circumferential is defined as being substantially tangent to a circle having its center at the axis and contained in a plane parallel to the mid-circumferential plane of the tire.

A carcass ply 44 extends between each of the respective beads 42. The carcass ply 44 has a pair of axially opposite end portions which extend around the respective bead 42. The carcass ply 44 is secured at the axially opposite end portions to the respective bead 42. The carcass ply 44 includes a plurality of substantially parallel extending reinforcing members each of which are made of a suitable configuration and material, such as several polyester yarns or filaments twisted together. It will be apparent that the carcass ply 44 is illustrated as a single ply but may include any appropriate number of carcass plies for the intended use and load of the tire 40. It will also be apparent that the reinforcing member may be a monofilament or any other suitable configuration or material.

The tire 40 illustrated also includes a belt package 46. The belt package 46 includes at least two annular belts. One of the belts is located radially outwardly of the other belt. Each belt includes a plurality of substantially parallel extending reinforcing members made of a suitable material, such as a steel alloy. The tire 40 also includes rubber for the tread 62 and sidewalls 64. The sidewalls are shown between plates 23. The rubber may be of any suitable natural or synthetic rubber, or combination thereof.

In the tire, uniformity characteristics may result from the assembly and curing operations in a tire plant. For example, the tire is tested after curing and cooling for certain uniformity characteristics, such as radial force variation, ply steer and/or conicity. The tire is placed on a uniformity tester (not shown). The uniformity tester is well known in the tire manufacturing art. The tire uniformity tester is available from a supplier such as Akron Standard, Akron, Ohio.

The tire is mounted in an inflated condition to its normal recommended operating pressure on a mounting device which simulates a vehicle rim. The tire is then engaged by a test wheel which loads the tire to an appropriate predetermined radial load. The relative distance between the axes of rotation of the tire and of the test wheel (center-to-center distance) is then fixed. The test wheel is rotated to impart rotation to the tire. Sensors which are operatively connected with the test wheel sense radial force variations from the load applied to the tire. The test parameters which may be adjusted for the test include applied load, inflation pressure and rolling radius of the tire. The parameters are dependent upon the type of tire and the particular size tire tested.

Figure 2:
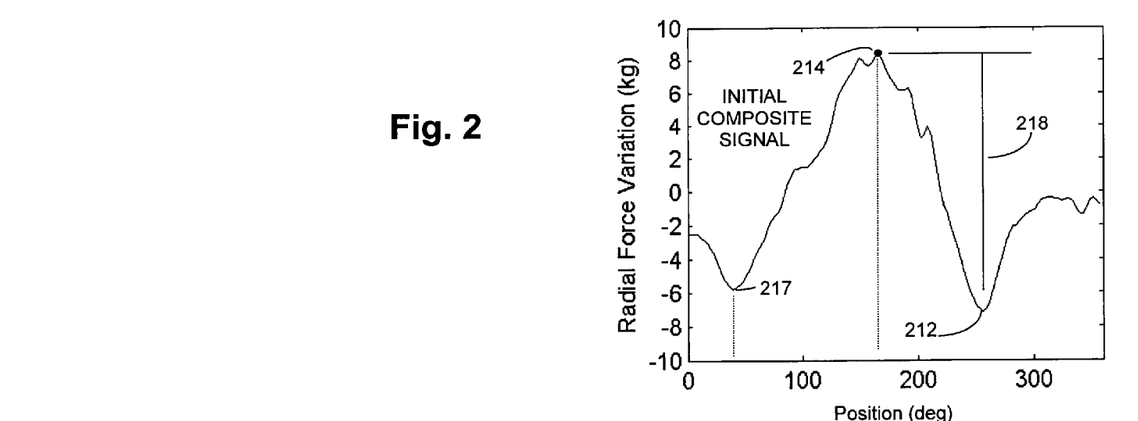
FIG. 2 is a graphical representation of a composite radial force variation of a tested tire as a function of the angular location around the tire.
Figure 3:
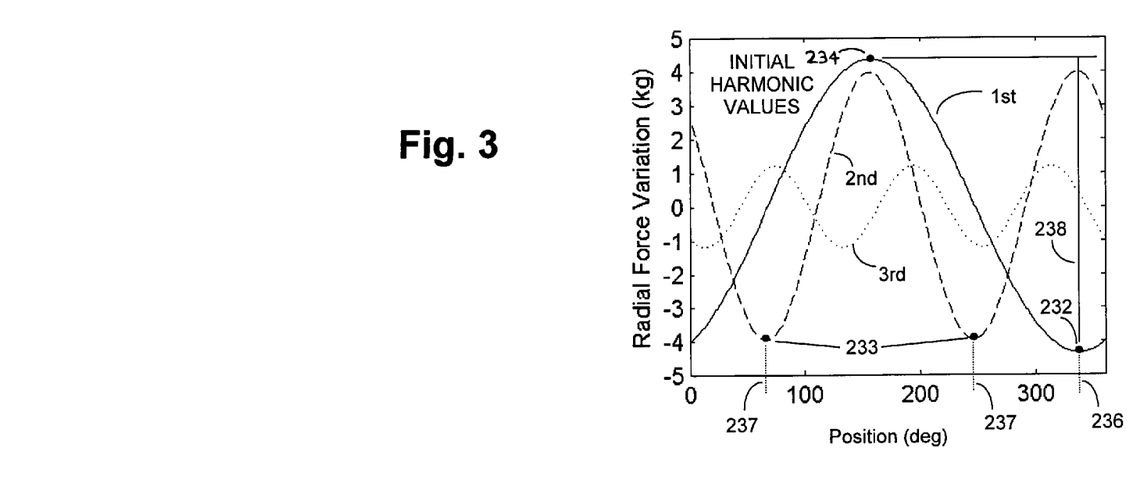
FIG. 3 is a graphical representation of the initial values of the first through third harmonics of a radial force variation of the tested tire.

In FIGS. 2 and 3 an initial radial force variation of the uncorrected tire, as tested, is graphically illustrated to represent corresponding output signals. The radial force variation as a function of circumferential position on the tire is represented by a wave form illustrated in FIG. 2, which may be decomposed into a number of desired harmonic wave forms, as illustrated in FIG. 3. The harmonic wave forms are determined in a computer by a Fourier analysis of the radial force variation wave form sensed during rotation of the loaded tire. In FIG. 3, for clarity of illustration purposes, only the uncorrected first through third harmonic radial force variations in kilograms of force variation from test load during rotation of the tire are graphically represented as a function of angular location around the tire from a reference location. It is apparent that the composite wave form is better represented by a greater number of harmonic wave forms. The analysis and wave forms are stored in the computer and referenced to a particular tire.

The composite radial force variation is typically determined by the tire uniformity tester. Once the radial force variation magnitude is determined, it is compared to a respective acceptable threshold limit. If the absolute value of the radial force variation magnitude is less than a respective predetermined minimum threshold magnitude limit, the tire is deemed acceptable and no further processing of the tire is needed. The tire is then typically shipped to a customer. If the tire has a magnitude for radial force variation greater than the corresponding acceptable minimum threshold magnitude limit, another comparison is performed. If the radial force variation magnitude is greater than a relatively large maximum threshold magnitude limit, the tire is deemed uncorrectable. If the tire is uncorrectable it is scrapped. If the tire falls within a predetermined range of magnitudes for radial force variation, it is forwarded for uniformity characteristic correction. For example, if the radial force variation magnitude is greater than the acceptable minimum threshold magnitude limit for shipping to a customer but less than the relatively large maximum threshold magnitude limit for scrapping, the tire may be corrected at a uniformity correction station. After the tire is corrected and allowed to sit for a period of time, for example twenty four hours, it may be again tested. This period is sufficient time to take into consideration any viscoelastic relaxation that occurred in the tire after correction. If the corrected tire has uniformity characteristic magnitudes below the minimum acceptable threshold limits it is shipped to the customer. If the tire does not have an acceptable uniformity character magnitude, it may be scrapped or may be again corrected. Preferably, after the tire is corrected once it will be below the acceptable minimum threshold magnitude limit and shipped to the customer.

Figure 4:
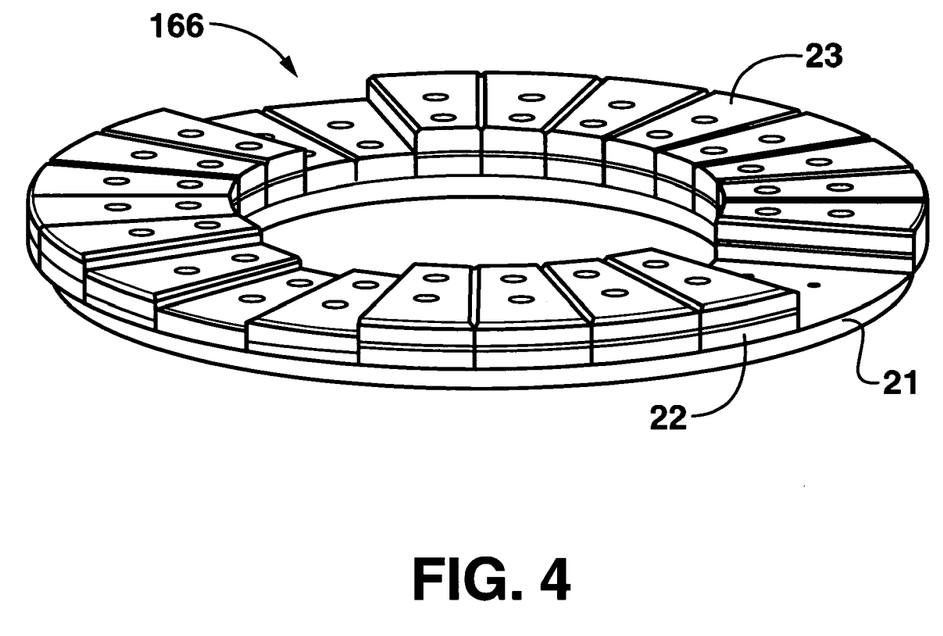
FIG. 4 is a elevational view of part of the apparatus embodying the present invention for correcting a uniformity characteristic of a tire.

FIG. 4 shows a depiction of the device used for correction. The device, as illustrated, includes a supporting ring 21, spacers 22 of various sizes and removable plates 23. As shown in FIG. 4, the ring 21 contains 24 plates 23 arranged in the circumferential direction, each one consisting of 15 degrees of arc length. This is intended as an example only, and any number of plates 23 can be used, with the arc lengths equal to 360 degrees divided by the number of plates 23, given the plates 23 are of the same arc length. The spacers 22 are inserted between the supporting ring 21 and the plates 23 to provide more variability in the amount of restraint. As an alternative to spacers 22, adjustable arms can be used between the plates 23 and the support ring 21, which can provide an infinite number of positions between the minimum and maximum height. Because the plates 23 are removable and their heights adjustable, multiple harmonics can be corrected simultaneously, subject only to the limitations of plate arc length. The mode of transportation of the tire may be manual or automated on a conveyor system. It should be apparent that the correction station could be a stand alone operation or be incorporated into a tire uniformity test machine for a combination test and correct operation.

Figure 5:
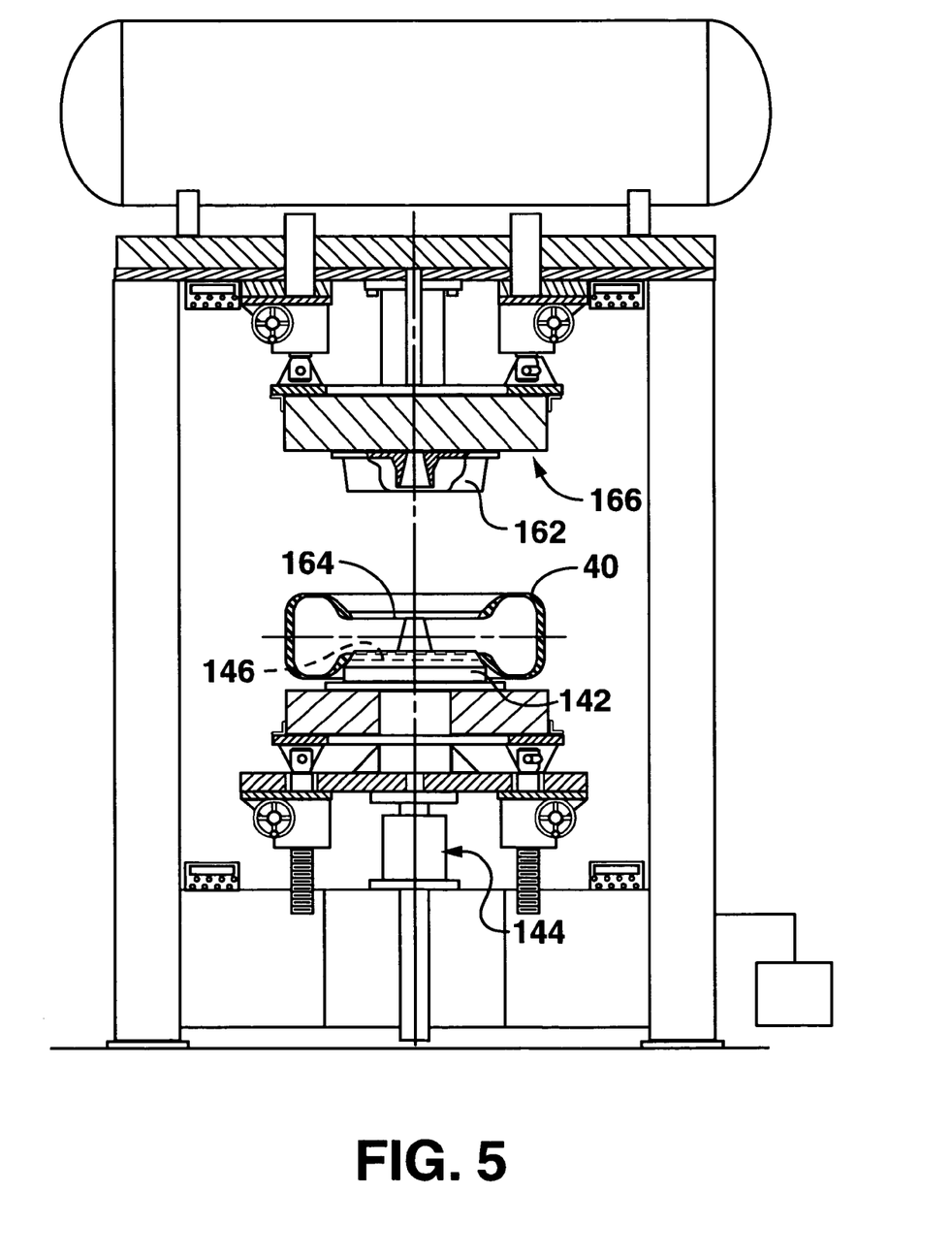
FIG. 5 is a elevational view of an apparatus embodying the present invention for correcting a uniformity characteristic of a tire, with a tire loaded on the apparatus.

A tire that is to be corrected is transported to a correction station embodying the present invention, as illustrated in FIG. 5. A lower simulated rim mounting 142 is moved upwardly by a main actuator 144. The lower simulated rim mounting 142 is brought into axial engagement with the lower bead area 146 of the tire 40. The tire 40 then is forced against the upper simulated rim mounting 162 at the upper bead area 164. The tire 40 is inflated with fluid pressure, such as air, to a pressure sufficient to seat the bead areas of the tire 40 against the simulated rim mountings 142, 162. Then the tire 40 is deflated to a relatively low pressure which is above the surrounding ambient atmospheric pressure and which pressure is approximately equal to one-tenth the recommended operating pressure of the tire. The plate and ring configuration is shown at 166.

Once the tire 40 is located in the correction station 140, a programmable controller operably connected with the correction station 140 and computer determines if conicity correction, radial forces variation correction or both is to be performed. At the tire correction station 140, the tire 40 has an indicator, such as a bar code label or an infrared ink identification, which is read and indicates information about the tire 40 to the controller. Such information may be, for example, information related to reference measurements (i.e., soft spot or hard spot) or a unique identifier, such as a serial number which is communicated to the controller. The controller can then input data associated with that serial number, such as the type of formity characteristic to be corrected as well as the wave forms and analysis that were stored in the computer in operation. Once this information is known to the controller the tire 40 located in the correction station 140 can be corrected.

If the controller and control program determine that radial force variation of the tire 40 is to be corrected, the controller and control program determine which radial force variation, composite or harmonic, is to be corrected. If for example, an operator or the control program has indicated that the first harmonic of the radial force variation is the desired harmonic to be corrected it sets input parameters, to be used in a later operation, indicating the first harmonic. Alternatively, the controller can be programmed to select the harmonic of the radial force variation to be corrected as a function of a predetermined parameter, such as the harmonic with the greatest magnitude. Once it is determined that one or more harmonics of the radial force variation is to be corrected it analyzes or reads the stored harmonic wave forms as illustrated in FIG. 3.

If the first harmonic of the radial force variation is to be corrected, an analysis of the first harmonic wave form (if it has not been analyzed already) is performed. Alternatively, any number of harmonics can be analyzed simultaneously, as well as a composite harmonic waveform. The analysis may have already been done and stored for use at this time. The analysis will now be described in detail for a better understanding of such analysis. The analysis can be better understood with reference to FIG. 3. In FIG. 3, the initial first harmonic wave form signal for the uncorrected tire 40, as tested, is illustrated. Only two radial force variation input parameters are required to initiate the first harmonic correction. The magnitude 238 and the location 236 from a reference location provide these parameters. The magnitude is the difference between the soft spot (minimum value) 232 magnitude and the hard spot (maximum value) 234 magnitude. The location is the angular position 236 of the soft spot 232 from the reference.

This peak-to-peak magnitude 238 is graphically represented as approximately 8.72 kg of first harmonic radial force variation. If this value is less than a respective predetermined minimum threshold magnitude limit, the tire is deemed acceptable and shipped to the customer. If the magnitude is greater than a relatively large maximum threshold magnitude limit, the tire would be scrapped. If it is apparent that the 8.72 kg approximate peak-to-peak magnitude 238 of first harmonic radial force variation is within a predetermined range of peak-to-peak magnitudes of, for example, 6 kg to 10 kg, the tire is suitable for correction.

Correction of the uniformity characteristic is accomplished by permanently deforming at least one, and preferably many, carcass reinforcing members. The stretching is done preferably by applying relatively high inflation pressure to the interior of the tire for a predetermined time. Input parameters are preferably used to determine control parameters for the correction operation. The control parameters are known to the controller before the correction operation is initiated. The input parameter of magnitude affects the determination of control parameters such as time and pressure which are applied to the tire. The input parameter of location 236 (FIG. 3) of the soft spot affects the positioning of the tire in the correction station. Other input parameters affecting the control parameter include the type and properties of material of the carcass reinforcing member. An example of properties include: diameter, pitch and number of filaments used in the carcass reinforcing member. Materials of the carcass reinforcing member such as nylon and polyester are readily adaptable to correction by the present invention. Materials such as steel, kevlar and rayon are not as easily permanently elongated and may require higher pressure or longer hold time.

With the tire properly located and initially inflated, the correction station 140 is then further activated so that both rim mounts come into axial engagement with the bead areas. The correction station 140 includes multiple plates which are brought into engagement with at least one corresponding sidewall of the tire. The number of plates brought into engagement with the sidewall or sidewalls of the tire is determined as a control parameter.

Radial force variation correction includes inflating the tire to a pressure above the recommended operating pressure of the tire as a function of input parameters while restraining a portion of the sidewall to control the distribution of the correction around the tire. Stretching and permanently lengthening a portion of the carcass reinforcing member at different locations around the tire can correct the uniformity characteristic of the tire. Permanent deformation or elongation is achieved by stretching a carcass reinforcing member beyond its elastic limit and holding it for a predetermined time. The distribution of the amount of lengthening is controlled by restraining the sidewall of the tire by an amount that varies around the circumference of the tire. This varying circumferential stretching is a function of the uniformity characteristic being corrected and other parameters.

Figures 6, 7:
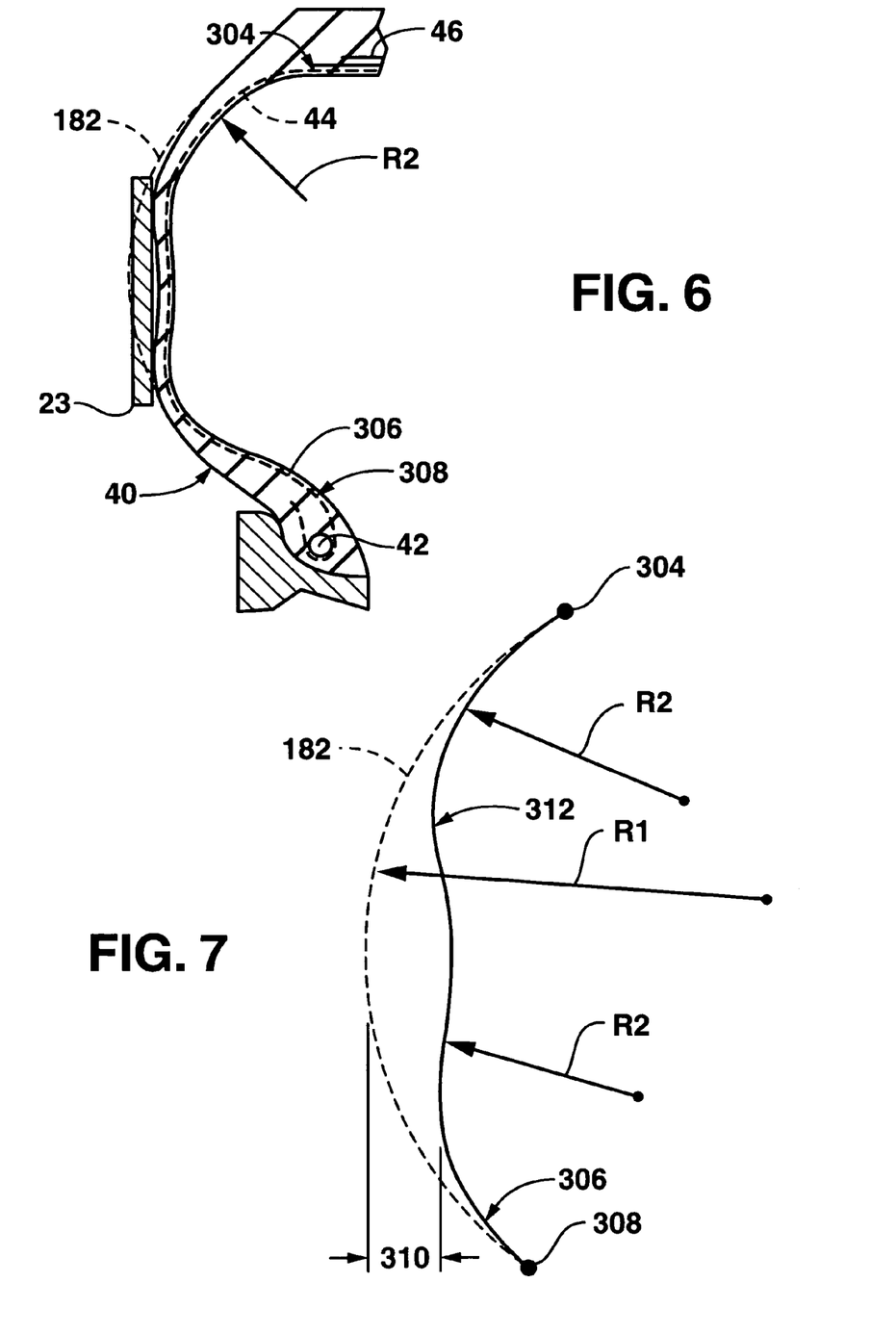
FIG. 6 is an enlarged cross-sectional view of a portion of the tire.
FIG. 7 is an enlarged cross-sectional view of a portion of the tire.

FIG. 6 illustrates the effect of plate constraint on the sidewall. The multiple plates of the correction machine engage the sidewalls with different axial displacements to impart a different radius of curvature to the portion of the carcass reinforcing member 306 in each of the sidewalls. The radius of curvature R2 in a maximally restrained portion of the tire 40 corresponding to the sidewall displacement is significantly less than radius of curvature R1 in the minimally restrained portion of the tire. Different radii of curvature provide different tension values in respective carcass reinforcing members. The undeflected portion of the sidewall is shown at 182.

The maximum amount of restraint to be applied for first harmonic radial force variation correction is at the first harmonic hard spot 234 on the tire at a location 180 degrees away from the location 236 of the first harmonic soft spot 232 indicated by the signal of FIG. 3. The maximum restraint occurs at the location of maximum axial displacement relative to the mid-circumferential plane of the tire. A minimum amount of restraint is applied to the sidewalls of the tire at the location of the first harmonic soft spot 232 indicated by the signal and known to the controller and correction station 140. The minimum restraint occurs at the location of minimum axial displacement relative to the mid-circumferential plane of the tire. More correction to the tire occurs at the location of minimum restraint and relatively less (or no) correction occurs at the location of maximum restraint.

Figure 8:
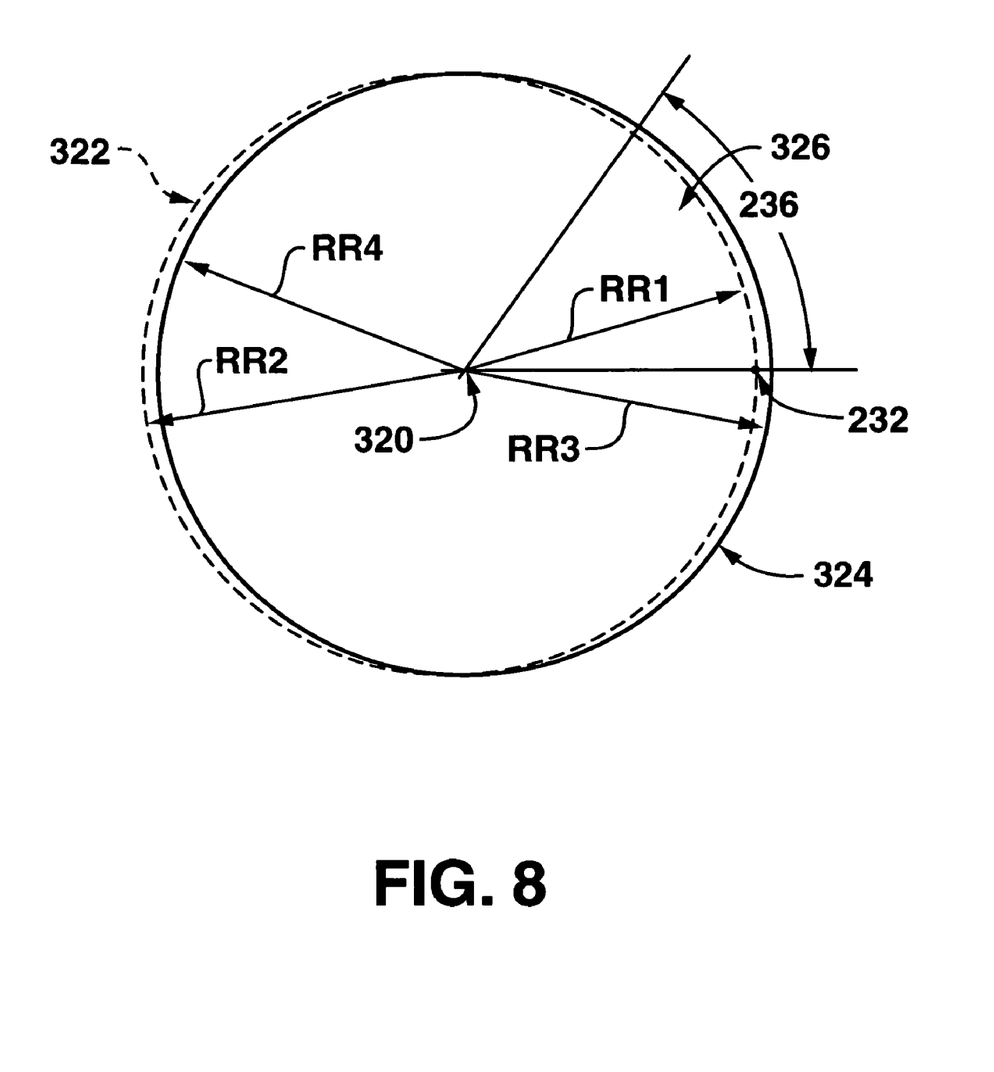
FIG. 8 is a side view of a tire before and after correction illustrating the introduction of radial runout of the tire to offset an existing radial force variation.

FIG. 7 is a schematic illustration of one carcass reinforcing member 306 being corrected according to the preferred embodiment of the present invention. A portion 182 of the carcass reinforcing member 306 is illustrated in FIG. 7 by a dashed line prior to being restrained. This portion 182 of the carcass reinforcing member 306 has an upper end point 304 at which load in the carcass reinforcing member is transmitted to the belt package 46 of the tire. The portion 182 of the carcass reinforcing member 306 has a lower end point 308 in the area of the bead 42 at which load in the carcass reinforcing member is transmitted to the bead of the tire. The deflected portions 312 of the portion 182 of the carcass reinforcing member 306 are illustrated in FIG. 8 in solid line. The deflection distance 310 is illustrated in FIG. 8 to correspond to the maximum amount of restraint discussed above in terms of deflection.

In the deflected portions 312 of the carcass reinforcing member 306 it will be apparent that the original or unrestrained radius of curvature R1 of the carcass reinforcing member has changed and is now a relatively smaller radius of curvature R2 in two locations. Physically the smaller radius R2 of portion 312, when the interior of the tire is subjected to the same relatively high inflation pressure, such as 100 psi or 7 bars, will not be permanently elongated the same amount as the unrestrained portion 182 of the carcass reinforcing member 306 having the relatively larger radius of curvature R1. The relationship between tension in the carcass reinforcing member 306, radius of curvature in the reinforcing member 306 and inflation pressure in the tire can be represented by the formula $T=R*P$, where T is the tension force in the portion 182 of the carcass reinforcing member 306, R is the radius of curvature of the portion 182 or 312 of the carcass reinforcing member 306 and P is the internal inflation pressure in the tire tension in the portion 182 of the carcass reinforcing member 306. Thus, it will be apparent that for a constant inflation pressure P, the larger the radius of curvature R of the portion 182 of the carcass reinforcing member 306, results in a relatively higher the tension T acting on that portion of the carcass reinforcing member. Thus, the higher tension in the portion 182 of the carcass reinforcing member 306 generally results in a relatively greater elongation above the elastic limit of the material which results in permanent elongation. The larger radius of curvature R1 in the portion 182 occurs at the location of minimum restraint around the tire with a planar ring restraint device.

The controller and control program determine the amount of restraint or displacement needed at the location of any of the harmonic soft spots 232 of the tire as a control parameter. The control parameters are preferably determined by a look up table as a function of the magnitude 238 of correction to be applied to the tire 40 and other input parameters. The look up table can be constantly updated to reflect the history of previously corrected tires. The amount of restraint is defined by the amount of axially inward deflection applied to a sidewall of the tire 40. For the example of H1, the maximum amount of desired deflection at the hard spot may be 15 millimeters as determined by the controller and control program in operation. The sidewalls of the tire are deflected axially 15 millimeters inwardly. This may be done manually or under controller and control program direction and verified by digital output display to indicate 15 millimeters of deflection. The minimum amount of restraint is applied to the sidewalls at a location of 180 degrees from the maximum amount of deflection. For example, the minimum amount of restraint may be 0 to 5 millimeters deflection as verified in the digital output displays or may even be a gap of 0 to 10 millimeters.

The maximum amount of deflection may be 15 millimeters in the axial direction. This means that each sidewall of the tire is deflected axially inwardly against the relatively low initial inflation pressure, such as 3 to 5 psi. The minimum amount of restraint may be 0 to 5 millimeters of axial deflection of the sidewall at the location 236 of the first harmonic soft spot 232 (FIG. 3). The inflation pressure of the tire is then raised significantly to a predetermined pressure above the recommended operating pressure of the tire, for example 100 psi or 7 bars, and held for a predetermined hold time. The minimum predetermined pressure is preferably in the range of two to three times the operating pressure of the tire. The predetermined hold time may be, for example, 10 seconds but will be considerably shorter than a cure cycle period. The minimum predetermined hold time is preferably at least one second. The input parameters as to amount of deflection, inflation pressure and hold time can be selected and varied by the controller and control program as a function of the magnitude of uniformity characteristic correction needed, the size of the tire, the properties of the tire and the intended application of the tire.

This relatively high predetermined pressure forces the carcass reinforcing members 306 of the tire to react to the elevated internal pressure and increase the tension in each carcass reinforcing member which results in lengthening. This increased tension and lengthening, when held even for a relatively short period of time above the elastic limit of the carcass reinforcing member 306, results in the permanent deformation by stretching of the carcass reinforcing members 306. The carcass reinforcing members 306 which have no or minimal restraint at the soft spot are permanently deformed the greatest amount. Less permanent deformation occurs gradually in both circumferential directions towards the hard spot 180 degrees from the soft spot. The least amount of deformation occurs at the location of maximum restraint at the hard spot 234. The permanently longer each carcass reinforcing member 306 gets relative to its prestretch length, the "harder" it becomes in terms of radial force variation due to its permanent elongation.

Another physical representation of what actually occurs when the first harmonic radial force variation of the tire has been corrected according to the present invention is illustrated in FIG. 8. It is known that radial runout of the tire affects the radial force variation. Such a radial runout is exaggerated in FIG. 9, as the outer circumference 322 of the tire in dashed line. The radius RR1 on the right side of the tire in relation to the center of rotation 320 of the tire established by the beads 42 is relatively smaller than the radius RR2 on the left side. The portion of the tire at the farmost location to the right would be deemed to be the location 236 of the soft spot 232 of the tire which would lend itself to first harmonic radial force variation correction.

During correction according to the present invention, the radius RR1 is increased over a rightmost portion 326 of the outer circumference 322 of the tire to a radius RR3 due to the relatively greater elongation of carcass reinforcing members in the vicinity of the soft spot 232. The radius RR2 is reduced to a radius RR4. The belt package 46 is relatively inextensible and the outer circumference of the tire does not increase. However, the location of the entire tread or outer circumference of the tire shifts to the right, as viewed in FIG. 8. This radial runout correction allows the now relatively uniform radii RR3, RR4 to establish new outer circumference 324 (solid line) relative to the center of rotation 320 for the corrected tire. What has actually taken place during the correction operation is correction by introducing a radial runout to the tire. This introduced radial runout offsets the first harmonic radial force variation regardless of the attribute of the tire producing the radial force variation. While the corrected radii RR3, RR4 are not exactly equal necessarily, the resulting radial force variation (be it composite or any harmonic) is reduced during rotation of the tire.

For the second, third, fourth or greater harmonics of radial force variation to be corrected, the location and number of minimum restraints must be varied on the sidewalls of the tire 40 during subsequent inflation and correction operations. For example, for the second harmonic of radial force variation to be corrected based on the wave form illustrated in FIG. 3 the amount of minimum restraint would be at two different locations 237 of second harmonic soft spots 233 from the location 236 of the first harmonic soft spot 232. Typically, the maximum amount of restraint as a function of the magnitude at the location indicated by the signal generated by the controller will likely be less for the second harmonic than for the first harmonic. The maximum restraint can be maintained in the controller and control program as a function of the second harmonic peak-to-peak magnitude. It should be apparent that higher order harmonics of the radial force variation would be corrected in a manner similar to that described for the first and second harmonics.

In addition to individual harmonics, because the plate height can be adjusted, multiple harmonics can also be corrected simultaneously. For example, at the first harmonic soft spot a minimum amount of restraint will be applied and at the first harmonic hard spot a maximum amount of restraint will be applied. At the same time, a pair of minimum restraints would be applied at the second harmonic soft spot and a pair of maximum restraints would be applied at the second harmonic hard spot. As pointed out above, generally the maximum restraint would be less for the second harmonic than for the first. This same approach can be applied to any number of higher harmonics subject only to the constraint of the number of plates used (and therefore the plate arc lengths).

Another correction option is that of composite radial force variation correction. It should be apparent, in the wave forms illustrated in FIGS. 2 and 3, that the locations 216, 236 of the respective soft spots 212, 232 may be offset relative to one another. This results because the Fourier analysis defines the locations of the soft spot and hard spot of, for example, the first harmonic wave form as being 180 degrees apart. Similar even spacing of the respective adjacent soft and hard spots of the other harmonic wave forms also occur. It should be also be apparent that the soft spot 212 of the composite wave form is not necessarily spaced 180 degrees from the hard spot 214 but occurs as sensed during testing.

After establishing that the tire can be corrected for multiple harmonics simultaneously, the next question is how to most effectively implement the system. Initially, the plate configuration used for correction was set by visual inspection of each tire's radial force variation waveform. Although this provided improvement to radial force variation, it became clear that an automated approach would reduce time and money and could provide even better results. This approach would automatically determine plate heights for maximum correction. In order to perform this task, first a correction model is created which can predict a correction waveform from a given plate configuration. Then, an optimization method is created to determine the best plate configuration based on the tire radial force variation waveform and the number of plates used.

Figure 9:
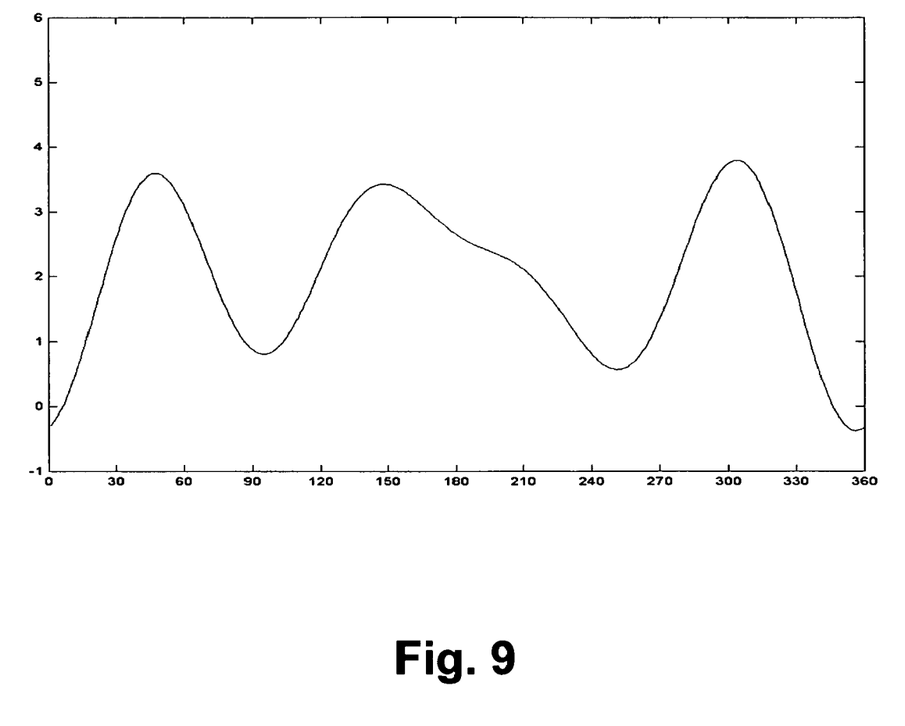
FIG. 9 is a graphical representation of the waveform of FIG. 10 after a smoothing and filtering operation has been performed.

The input parameters to the correction model are the plate configuration and the number of harmonics. The output of the correction model is a predicted correction waveform for the provided inputs. In order to predict the correction waveform, the amount of chord stretch as a function of drop in plate height must be determined. This value was calculated from a design of experiments using a given tire dimension and is provided in terms of the amount of correction in kg for the amount of plate drop in mm. The initial waveform is a square wave based on the height and width of each plate. The waveform is then filtered to accommodate for the maximum amount of stretch of each chord; however, it will still be essentially a square wave. Because the sidewall of the tire can not conform to a square waveform, it must be smoothed. The waveform is then filtered to remove any sharp peaks using the requested number of harmonics. FIG. 9 shows the waveform after filtering and smoothing.

Figure 10:
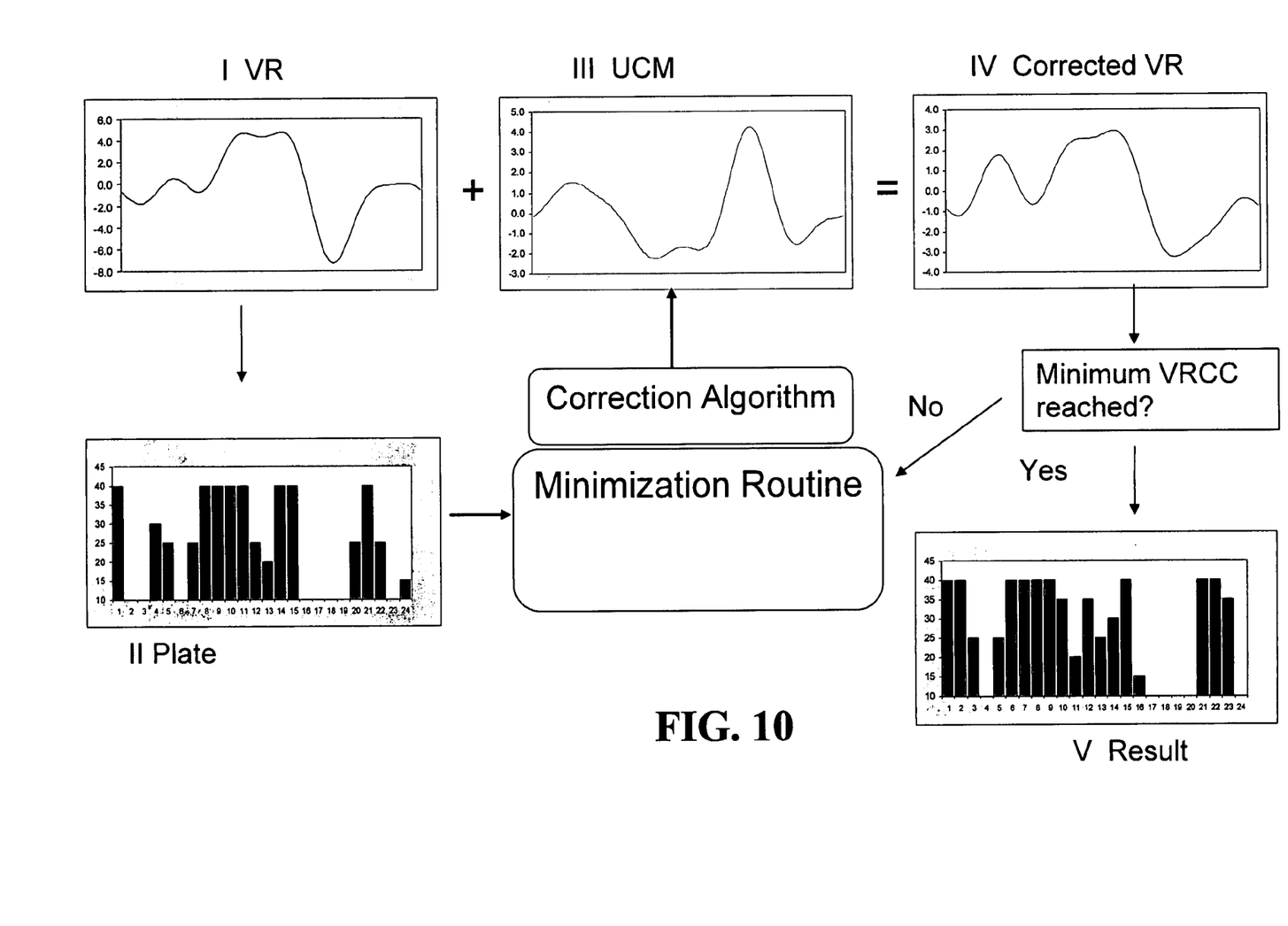
FIG. 10 is a flowchart of an optimization routine.

Next an optimization routine was developed to produce the best plate configuration for a given tire waveform. The routine allows the plate heights to vary within the range of a specified upper and lower bounds. The input variable is the number of plates, while the minimized output is the radial force variation of a corrected tire. A flowchart for the operation is shown in FIG. 10. Reference I shows the tires initial uncorrected waveform. An initial guess at the plate configuration is shown in II. After running through the minimization routine, the correction waveform is generated from the correction model above as shown in III. The resulting corrected tire wave form is shown IV. If the minimum radial force variation has been reached, the process ends and the output plate configuration is shown V. If not, the process loops back.

Figure 11:
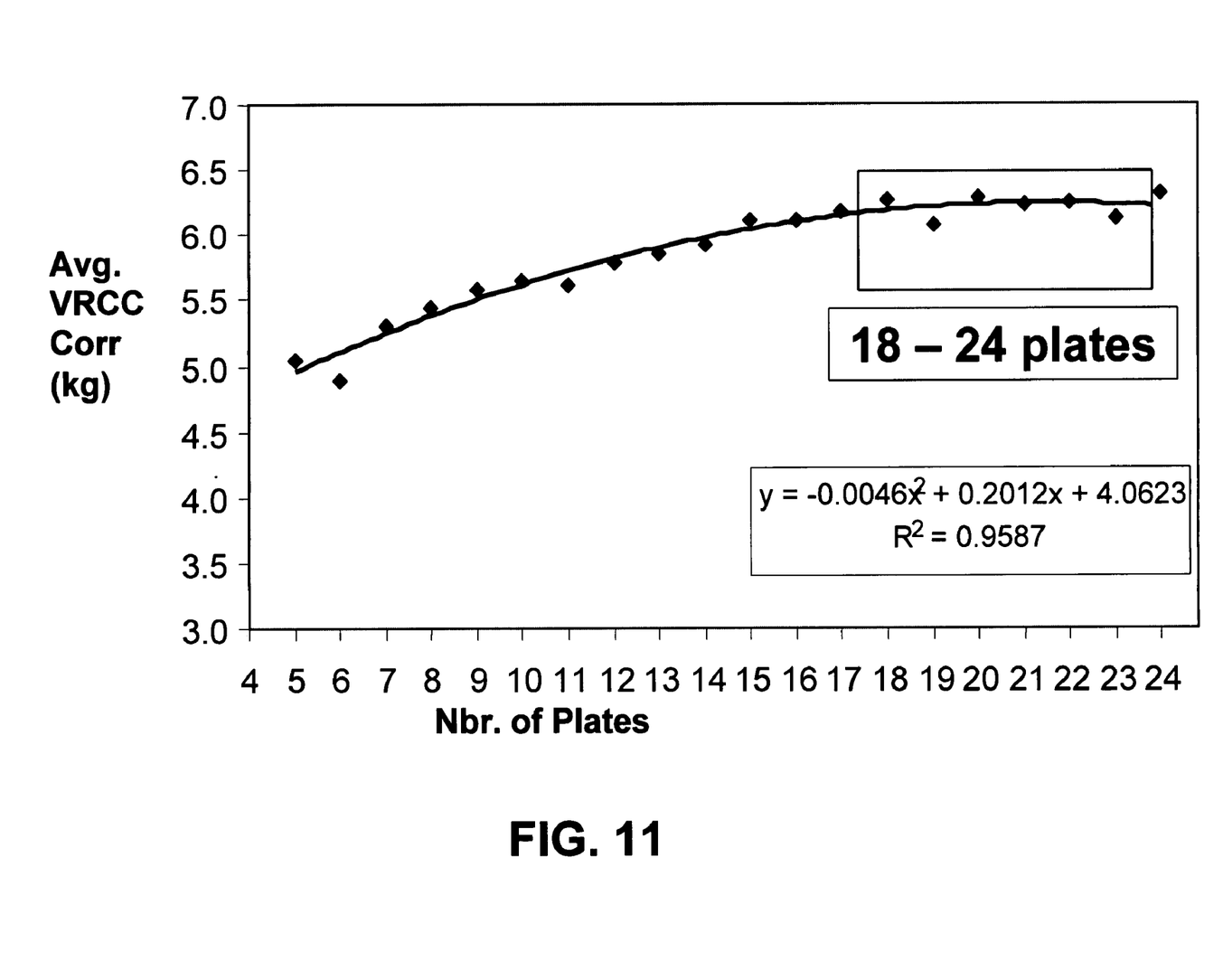
FIG. 11 is a graphical representation of the optimal number of plates.

To determine the optimum number of plates to use, a simulation was performed using from 5 to 25 plates. A graph of the results is shown in FIG. 11. The graph reveals that at around 18 plates, the curve levels off asymptotically. Therefore, it appears that anywhere from 18 to 24 plates would be ideal.

The invention claimed is:

1. A method for reducing the magnitude of uniformity characteristics in a cured tire using a supporting ring, the tire defining axial and circumferential directions, the method comprising the steps of:
    providing a look up table containing the amount of restraint as a function of the magnitude of correction of a uniformity characteristic as developed from previously corrected tires;
    generating a signal indicative of the magnitude and location of uniformity characteristics for the cured tire;
    selecting from the look up table the amount of restraint to be provided by the supporting ring for correction of the uniformity characteristics of the cured tire;
    placing a plurality of plates about the supporting ring so as to provide the amount of restraint from said selecting step to the cured tire; and,
    applying the supporting ring with the plurality of plates to the cured tire so as to constrain at least one sidewall of the tire with at least one of said plates in order to cause permanent deformation and correction of a uniformity characteristic.

2. A method for reducing the magnitude of uniformity characteristics in a cured tire as in claim 1, further comprising the step of decomposing the signal into at least one harmonic.

3. A method for reducing the magnitude of uniformity characteristics in a cured tire as in claim 1, further comprising the step of decomposing the signal into at least two harmonics.

4. A method for reducing the magnitude of uniformity characteristics in a cured tire as in claim 3, wherein the position of the plates used in said applying step is designed to reduce at least two harmonics of the signal.

5. A method for reducing the magnitude of uniformity characteristics in a cured tire as in claim 3, wherein said applying step results in permanent deformation of the tire that reduces at least two harmonics of the signal.

6. A method for reducing the magnitude of uniformity characteristics in a cured tire as in claim 3, wherein said selecting step is based on analysis of one or more harmonics from said decomposing step.

7. A method for reducing the magnitude of a uniformity characteristic in a cured tire, the tire having sidewalls and defining axial and radial directions, the method comprising the steps of:
    generating a signal indicative of the magnitude and location of at least one uniformity characteristic for the cured tire;
    providing a supporting ring with a plurality of plates having an adjustable height that can be used to engage and provide axial displacement to at least one sidewall of the tire;
    determining the amount and the location of axial displacement to be applied by the supporting ring using the signal from said generating step and a history of previously corrected tires;
    adjusting the height of the supporting ring by adjusting the late heights using the amount and location of axial displacement provided from said determining step; and
    applying the supporting ring with the plurality of plates to the cured tire so as to displace the sidewall of the tire for correction of a uniformity characteristic.

8. A method for reducing the magnitude of uniformity characteristics in a cured tire as in claim 7, further comprising the step of decomposing the signal into at least one harmonic.

9. A method for reducing the magnitude of uniformity characteristics in a cured tire as in claim 7, further comprising the step of decomposing the signal into at least two harmonics.

10. A method for reducing the magnitude of uniformity characteristics in a cured tire as in claim 7, wherein the axial displacement from said determining step is designed to reduce at least two harmonics of the signal.

11. A method for reducing the magnitude of a uniformity characteristic in a cured tire, the tire having sidewalls and defining axial and radial directions, the method comprising the steps of:

generating a waveform indicative of the magnitude and location of at least one uniformity characteristic for the cured tire;

providing a supporting ring that can be used to engage and restrain at least one sidewall when the tire is inflated, the supporting ring having a plurality of plates that are height adjustable so as to provide variability in the amount of restraint applied to at least one sidewall of the tire;

selecting an initial configuration of the plates of the supporting ring;

predicting a corrected waveform for the tire;

comparing the corrected waveform with a desired amount of correction of the uniformity characteristic of the tire and, if the desired amount of correction has not been reached, then choosing another configuration for the plates of the supporting ring; and repeating said predicting and comparing steps until a corrected waveform is predicted that provides the desired amount of correction of the uniformity characteristic; and, applying the supporting ring with the plurality of plates to the at least one sidewall of the cured tire so as to restrain the sidewall of the tire for correction of a uniformity characteristic.

12. A method for reducing the magnitude of a uniformity characteristic in a cured tire as in claim 11, wherein said predicting step uses a correction model that is based on experimental data.

13. A method for reducing the magnitude of a uniformity characteristic in a cured tire as in claim 12, wherein the input parameters for the correction model include the configuration of plates on the supporting ring and the number of harmonics for which correction is desired.

* * * * *